United States Patent
Wan et al.

(10) Patent No.: US 12,337,688 B2
(45) Date of Patent: Jun. 24, 2025

(54) SYSTEMS AND METHODS FOR ANNOTATING POINTS OF INTEREST ON HEAD-UP DISPLAY

(71) Applicant: Ford Global Technologies, LLC, Dearborn, MI (US)

(72) Inventors: Jian Wan, Novi, MI (US); Kenneth Michael Mayer, Ypsilanti, MI (US); Clay Wesley Maranville, Ypsilanti, MI (US); Curtis Sai-Hay To, Troy, MI (US); Neha Singhal, Northville, MI (US); Dima Khanafer, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/337,985

(22) Filed: Jun. 20, 2023

(65) Prior Publication Data
US 2024/0424895 A1    Dec. 26, 2024

(51) Int. Cl.
*B60K 35/00*    (2024.01)
*B60K 35/10*    (2024.01)
(Continued)

(52) U.S. Cl.
CPC .............. *B60K 35/00* (2013.01); *B60K 35/10* (2024.01); *B60K 35/23* (2024.01); *B60K 35/28* (2024.01);
(Continued)

(58) Field of Classification Search
None
See application file for complete search history.

(56) References Cited

U.S. PATENT DOCUMENTS 8,311,526 B2 * 11/2012 Forstall ................... H04W 4/02
                                                          455/414.3
9,581,457 B1 * 2/2017 Meredith ........... G01C 21/3679
(Continued)

FOREIGN PATENT DOCUMENTS

EP          3252432 A1    12/2017

OTHER PUBLICATIONS

Amr Gomaa et al., Studying Person-Specific Pointing and Gaze Behavior for Multimodal Referencing of Outside Objects From a Moving Vehicle, ICMI 20, Virtual Event, Netherlands, Oct. 25-29, 2020, pp. 501-509.

*Primary Examiner* — Patrick N Edouard
*Assistant Examiner* — Peijie Shen
(74) *Attorney, Agent, or Firm* — Frank Lollo; Eversheds Sutherland (US) LLP

(57) ABSTRACT

A vehicle including a head-up display (HUD), a transceiver and a detection unit is disclosed. The transceiver may be configured to receive vehicle information and information associated with a geographical area in which the vehicle may be located. The detection unit may be configured to detect a user eye gaze direction. The vehicle may further include a processor configured to obtain the vehicle information, the information associated with the geographical area and the user eye gaze direction responsive to obtaining a trigger signal. The processor may determine an object in the geographical area that a user may be viewing based on the vehicle information, the information associated with the geographical area and the user eye gaze direction. The processor may further render an object identifier associated with the object on the HUD till the vehicle travels past the object, responsive to determining the object.

18 Claims, 5 Drawing Sheets

(51) Int. Cl.
  *B60K 35/23* (2024.01)
  *B60K 35/28* (2024.01)
  *B60K 35/81* (2024.01)

(52) U.S. Cl.
  CPC ........ *B60K 35/81* (2024.01); *B60K 2360/149* (2024.01); *B60K 2360/164* (2024.01); *B60K 2360/166* (2024.01)

(56) References Cited

U.S. PATENT DOCUMENTS

| | | | |
|---|---|---|---|
| 10,067,341 B1 | 9/2018 | Breed et al. | |
| 2004/0178894 A1 | 9/2004 | Janssen | |
| 2010/0042932 A1* | 2/2010 | Lehtiniemi | G06Q 30/0269 715/747 |
| 2012/0093357 A1* | 4/2012 | Seder | B60W 30/095 382/103 |
| 2012/0163772 A1* | 6/2012 | Nabeshima | H04N 9/8233 386/E5.003 |
| 2013/0253831 A1* | 9/2013 | Langendorff | G01C 21/26 701/538 |
| 2014/0010405 A1* | 1/2014 | Sivaraman | G01C 21/3476 382/103 |
| 2015/0293354 A1* | 10/2015 | Oishi | B60W 50/14 345/7 |
| 2016/0179195 A1 | 6/2016 | Motz et al. | |
| 2017/0336631 A1* | 11/2017 | Armstrong | G02B 30/34 |
| 2018/0012085 A1* | 1/2018 | Blayvas | G06F 18/2414 |
| 2018/0292952 A1* | 10/2018 | Norman | G06F 3/04842 |
| 2018/0349413 A1* | 12/2018 | Shelby | G06F 16/9535 |
| 2019/0019011 A1* | 1/2019 | Ross | G06T 19/006 |
| 2019/0043235 A1* | 2/2019 | Tsushima | B60K 35/29 |
| 2019/0180485 A1* | 6/2019 | Kim | G06V 20/20 |
| 2020/0326201 A1* | 10/2020 | Nara | G06F 3/147 |
| 2020/0410264 A1* | 12/2020 | Ahn | B60K 35/265 |
| 2021/0019942 A1 | 1/2021 | Ophir et al. | |
| 2021/0125411 A1* | 4/2021 | Choi | G06T 7/70 |
| 2021/0276421 A1* | 9/2021 | Yao | B60K 35/29 |
| 2021/0291653 A1* | 9/2021 | Higashiyama | B60K 35/22 |
| 2021/0389152 A1* | 12/2021 | Beaurepaire | G01C 21/3635 |
| 2022/0005349 A1* | 1/2022 | Schulz | G01C 21/3476 |
| 2022/0080826 A1* | 3/2022 | Shoji | G08G 1/0969 |
| 2023/0135641 A1* | 5/2023 | Miyake | B60K 35/22 701/36 |
| 2023/0236038 A1* | 7/2023 | Hayashi | G01S 5/16 701/300 |
| 2023/0258466 A1* | 8/2023 | Lee | G01C 21/3617 701/426 |
| 2023/0296394 A1* | 9/2023 | Lee | G06T 11/00 701/436 |
| 2023/0298277 A1* | 9/2023 | Szczerba | G06T 19/006 345/633 |
| 2024/0062432 A1* | 2/2024 | Lee | G06T 11/00 |
| 2024/0071074 A1* | 2/2024 | Kang | G06V 20/20 |
| 2024/0255289 A1* | 8/2024 | Bagon | G06T 19/00 |
| 2024/0330983 A1* | 10/2024 | Isaacs | G06Q 30/0639 |

\* cited by examiner

SYSTEMS AND METHODS FOR ANNOTATING POINTS OF INTEREST ON HEAD-UP DISPLAY

FIELD

The present disclosure relates to systems and methods for annotating points of interest (POI) on a vehicle head-up display (HUD) and more particularly to systems and methods for annotating POIs on the vehicle HUD based on user eye gaze direction.

BACKGROUND

Many modern vehicles include head-up displays that display important vehicle information that may assist users when the vehicles are in motion. For example, a head-up display (HUD) may display information associated with navigation instructions, vehicle speed, battery state of charge (SoC)/fuel level, etc., that may assist a user while driving a vehicle.

While the vehicle information displayed on the HUD may be beneficial for the user, there may be instances when the user may desire additional information.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
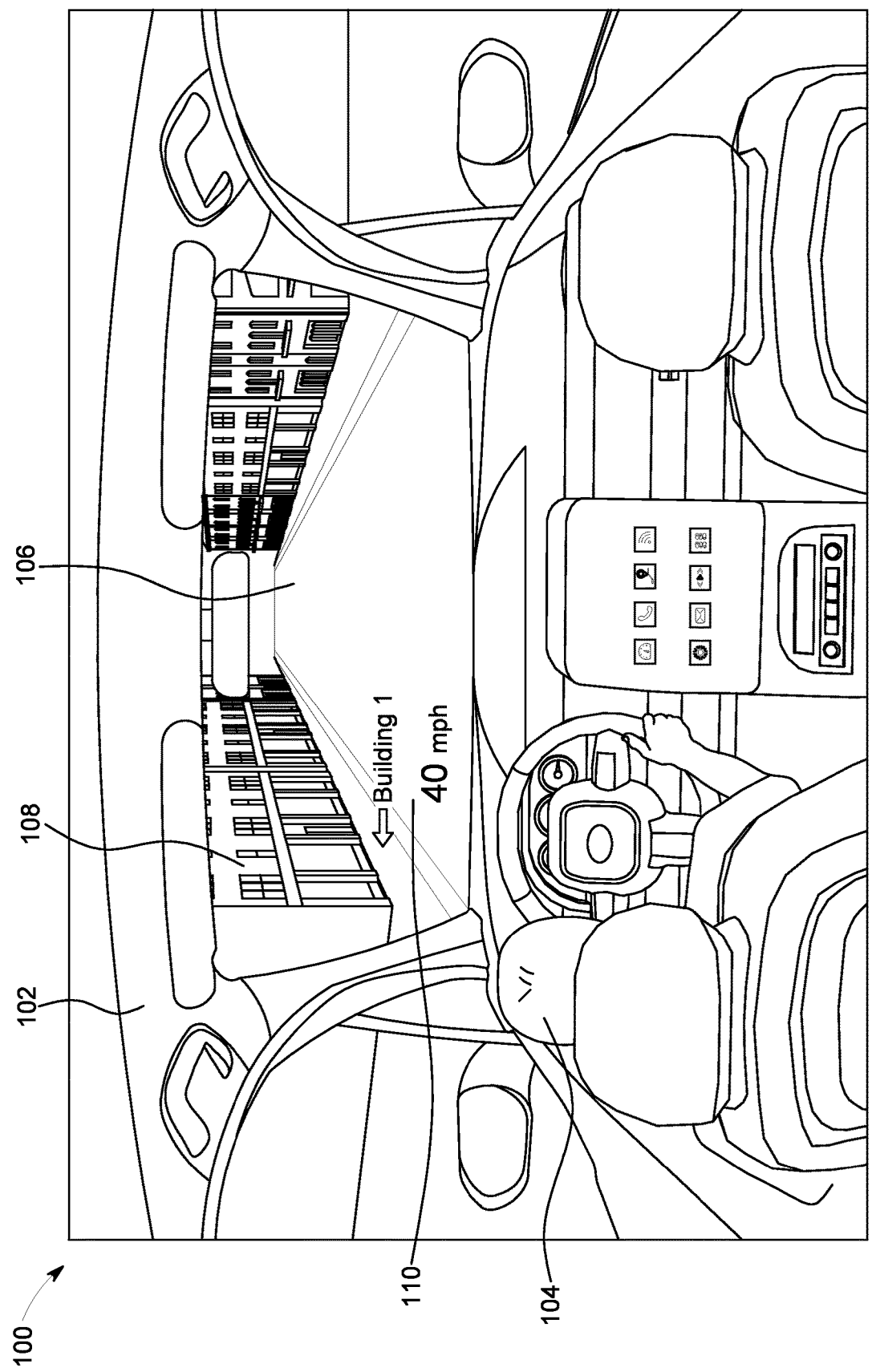
FIG. 1 depicts an exemplary environment in which techniques and structures for providing the systems and methods disclosed herein may be implemented.

The present disclosure describes a vehicle including an Augmented Reality head-up display (HUD) configured to display information that may assist a driver in driving the vehicle. For example, the HUD may display vehicle speed, battery state of charge (SoC)/fuel level, navigation instructions, etc., which may assist the driver in driving the vehicle. The HUD may be additionally configured to display information associated with objects that the driver may be interesting in knowing information about, e.g., points of interest (POI). Specifically, the HUD may be configured to display names of building/structures (or other details) that the driver may be viewing through front windshield while driving the vehicle on a road. The HUD may display a building name for a preset time duration and/or till the vehicle travels past the building, which may enable the driver to view the building name on the HUD when the driver returns the gaze from the building to the HUD.

The vehicle may include an eye gaze detection unit that may detect a driver eye gaze direction when the driver views the building. The vehicle may be further configured to obtain real-time vehicle geolocation, vehicle orientation/pose, and a digital map of a geographical area in which the vehicle may be located. The vehicle may correlate the driver eye gaze direction with the real-time vehicle geolocation, the vehicle orientation/pose, and the geographical area digital map to determine the building that the driver may be viewing. The processor may further determine the building name based on the geographical area digital map, responsive to determining the building that the driver may be viewing.

In some aspects, the driver may provide preferences to the vehicle for the types of buildings/structures for which the driver desires to view corresponding names. For example, the driver may provide preferences indicating that the driver desires to view names of tourist spots, restaurants, etc., while driving on the road. In this case, responsive to determining the building that the driver may be viewing, the vehicle may additionally determine building type based on the geographical area digital map. The vehicle may display the building name on the HUD when the building type matches with the type of building/structure for which the driver desires to view the names.

The present disclosure discloses a vehicle that displays information associated with POIs on the HUD. Since the vehicle displays the information associated with the buildings that the driver may be viewing, the displayed information is relevant to the driver. Further, the information displayed on the HUD may assist the driver in knowing details of buildings along the roadside during low visibility weather conditions (e.g., during fog, snowfall, rain, etc.). Furthermore, the information stays on the HUD for a predefined short time duration or till the vehicle travels past the building, thus ensuring that the displayed information does not distract the driver while driving the vehicle.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may take the form of any passenger or commercial vehicle, such as, for example, a car, a work vehicle, a crossover vehicle, a truck, a van, a minivan, a taxi, a bus, etc. The vehicle 102 may be a manually driven vehicle, and/or may be configured to operate in a partially autonomous mode and may include any powertrain, such as, for example, a gasoline engine, one or more electrically-actuated motor(s), a hybrid system, etc. A vehicle user 104 (or a driver 104) may be driving the vehicle 102 on a road 106. The road 106 may be located in a geographical area including one or more buildings 108, tourist spots, restaurants, parking lots, gas stations/electric vehicle (EV) charging stations, and/or the like.

The vehicle 102 may include an Augmented Reality head-up display 110 (or HUD 110) that may be disposed on (or in proximity to) a vehicle front windshield. The HUD 110 may be configured to display information that may assist the driver 104 when the driver 104 drives the vehicle 102. For example, the HUD 110 may display important vehicle information such as vehicle speed, battery state of charge (SOC)/fuel level, etc., navigation instructions, information associated with weather conditions, date and time, distance from a vehicle in front, and/or the like. In some aspects, the HUD 110 may be communicatively coupled with a user device (not shown) and/or one or more vehicle components that may enable the HUD 110 to receive and display the information described above.

In some aspects, the driver 104 may activate a POI annotation mode of the HUD 110 that may enable the HUD 110 to display additional information. For example, when the driver 104 activates the POI annotation mode, the HUD 110 may display information associated with one or more POIs that may be located along the road 106. In some aspects, the driver 104 may activate the POI annotation mode by actuating a dedicated actuator/button that may be disposed inside the vehicle 102, e.g., on a vehicle steering wheel. In other aspects, the driver 104 may activate the POI annotation mode by a voice command, a predefined hand-gesture, via a user device or a vehicle infotainment system, and/or the like.

In an exemplary aspect, the HUD 110 may display information associated with one or more objects (e.g., structures or buildings) that may be present in the geographical area in which the vehicle 102 may be travelling when the driver 104 activates the POI annotation mode. Specifically, the HUD 110 may display information associated with buildings/structures ("POIs") that the driver 104 may be viewing through the vehicle front windshield. For example, the HUD 110 may display information associated with a "Building 1" (that may be one of the buildings 108 located along the road 106) when the driver 104 views the Building 1 through the vehicle front windshield. The information associated with Building 1 that may be displayed on the HUD 110 may include building name (as shown in FIG. 1) and/or any other additional information that may be beneficial for the driver 104. As an example, the HUD 110 may display "Parking lot of Building 1" when the driver 104 may be viewing the parking lot of Building 1 through the vehicle front windshield. Hereinafter, the terms "object" and "POI" are interchangeably used.

By displaying information associated with objects that the driver 104 may be viewing on the HUD 110, the present disclosure provides additional functionality. For example, in a conventional HUD system, when the driver 104 reaches a destination location (e.g., the Building 1), the HUD 110 or the user device may only display and notify that the driver 104 has reached the destination location. However, when the destination location may be a large building, a university or office complex, and/or the like, the driver 104 may desire additional information that may assist the driver 104 while driving (e.g., knowing whether an object/structure that the driver 104 may be viewing is an entry to the building, an exit from the building, a parking lot, etc.). The present disclosure enables the driver 104 to view such additional information based on the objects that the driver 104 may be viewing.

The present disclosure may also assist the driver 104 when the driver 104 may be driving through a geographical area that may be unknown to the driver 104. For example, when the driver 104 may be driving through a geographical area as a tourist (e.g., for a first time), the driver 104 may desire to view names and additional information associated with objects/structures along the road 106. The present disclosure enables the driver 104 to view such additional information. In this case, the driver 104 may provide inputs to the vehicle 102 (e.g., via the user device or the vehicle infotainment system) indicating the types of objects that the driver 104 may be interested in viewing additional information about, and the HUD 110 may display information about the objects that may of interest to the driver 104. For example, before starting a trip or while on the trip, the driver 104 may provide inputs to the vehicle 102 indicating that the driver 104 is interested in viewing information about tourist spots when the vehicle 102 traverses the road 106. In this case, the HUD 110 may display information about only those objects/structures on the road 106 that may be tourist spots when the driver 104 looks at them through the vehicle front windshield (and may not display information about other objects/structures).

In some aspects, the HUD 110 may display the information associated with the object (e.g., the POI) for a predefined time duration or till the vehicle 102 travels past the object. Further, to enable the HUD 110 to display information associated with the POI, the vehicle 102 may include a detection unit (e.g., a vehicle interior camera) that may detect driver eye gaze direction when the driver 104 views the POI along the road 106. In this case, the vehicle 102 may be communicatively coupled with an external server (shown as server 206 in FIG. 2) that may provide real-time vehicle geolocation and a digital map of the geographical area in which the vehicle 102 may be located to the vehicle 102. The vehicle 102 may additionally include an Inertial Measurement Unit (IMU) that may detect vehicle orientation/heading (or vehicle pose) when the vehicle 102 travels on the road 106. The vehicle 102 may correlate the detected driver eye gaze direction with the real-time vehicle geolocation, the vehicle orientation/heading, and the geographical area digital map to determine and display information (e.g., POI name) associated with the POI that the driver 104 may be viewing on the HUD 110.

Further details of the vehicle 102 are described below in conjunction with FIG. 2.

The vehicle 102 and/or the driver 104 implement and/or perform operations, as described here in the present disclosure, in accordance with the owner manual and safety guidelines.

Figure 2:
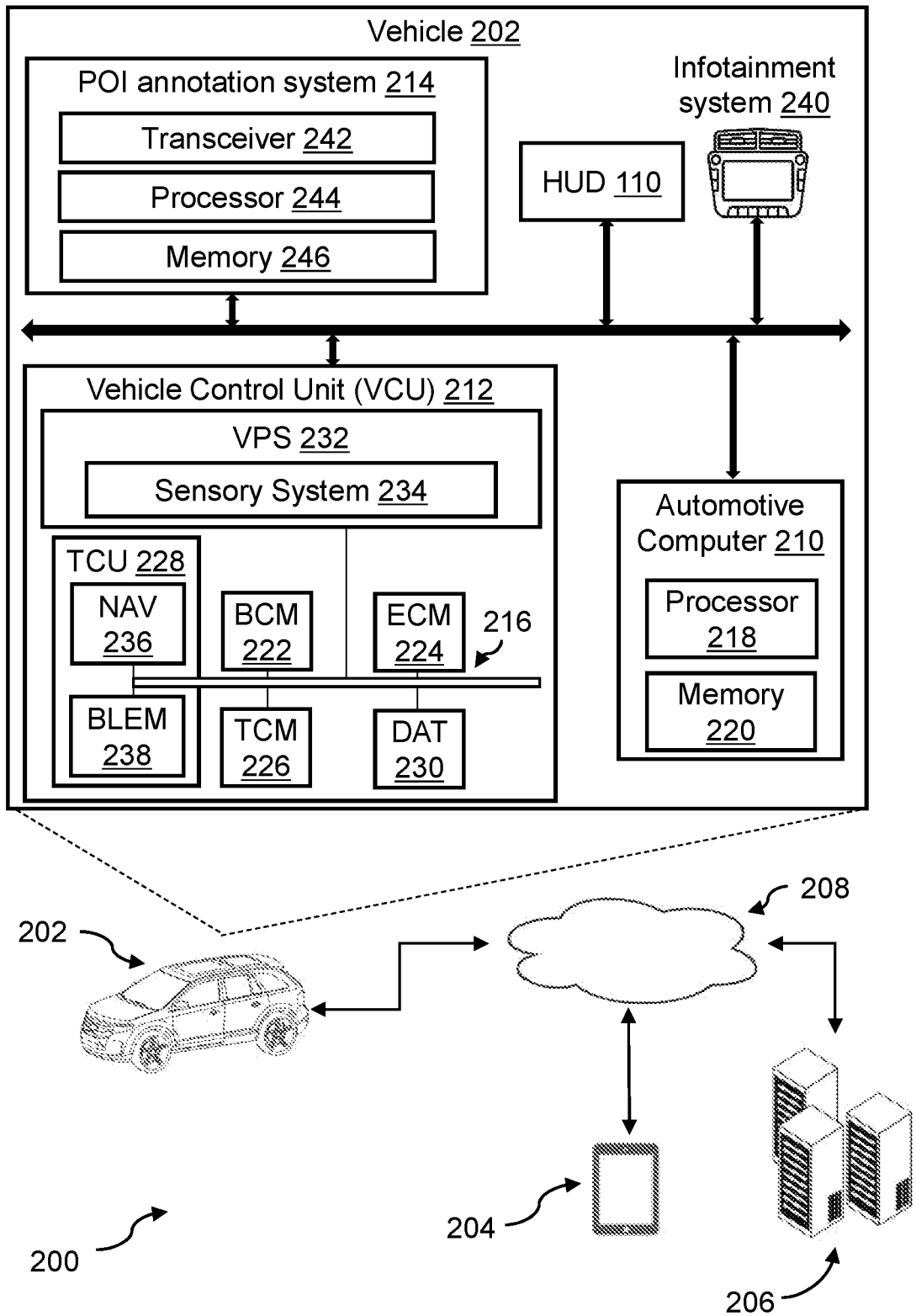
FIG. 2 depicts a block diagram of an exemplary system for annotating an object on a vehicle head-up display (HUD) in accordance with the present disclosure.

FIG. 2 depicts a block diagram of an example system 200 for annotating an object on a vehicle head-up display (e.g., the HUD 110) in accordance with the present disclosure. While describing FIG. 2, references may be made to FIGS. 3 and 4.

The system 200 may include a vehicle 202, a user device 204, and one or more servers 206 communicatively coupled with each other via one or more networks 208. The vehicle 202 may be same as the vehicle 102 described above in conjunction with FIG. 1. The user device 204 may be associated with the driver 104, and may include, but is not limited to, a mobile phone, a laptop, a computer, a tablet, a wearable device, or any other similar device with communication capabilities. The server(s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a commercial vehicle fleet. In further aspects, the server(s) 206 may store information associated with a geographical area in which the vehicle 202 may be located. The information associated with the geographical area may include, but is not limited to, names of objects (buildings, structures, etc.) located in the geographical area, a digital map of the geographical area, building/structure type (e.g., office building, tourist spot, gas or charging station, restaurant, etc.) and/or the like. In additional aspects, the server(s) 206 may be configured to provide navigation instructions to the vehicle 202, the user device 204, and a plurality of other vehicles and user devices (not shown) based on source and destination locations provided by respective vehicles/user devices to the server(s) 206.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and a POI annotation system 214. The VCU 212 may include a plurality of Electronic Control Units (ECUs) 216 disposed in communication with the automotive computer 210.

The user device 204 may connect with the automotive computer 210 and/or the POI annotation system 214 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 210 and/or the POI annotation system 214 may be installed in a vehicle engine compartment (or elsewhere in the vehicle 202), in accordance with the disclosure. Further, the automotive computer 210 may operate as a functional part of the POI annotation system 214. The automotive computer 210 may be or include an electronic vehicle controller, having one or more processor(s) 218 and a memory 220. Moreover, the POI annotation system 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable memory storing a POI annotation program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle systems, connected servers (e.g., the server(s) 206), and other vehicles (not shown in FIG. 2) operating as part of a vehicle fleet. The VCU 212 can include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, ambient weather sensors, vehicle interior and exterior cameras, steering wheel sensors, inertial measurement unit (IMU), etc. In an exemplary aspect, the vehicle interior camera(s) and/or the radar sensors may be configured to capture eye gaze movement of the driver 104 when the driver 104 drives the vehicle 202. Further, the IMU may be configured to detect vehicle orientation, heading or pose when the vehicle 202 may be travelling on the road 106.

In some aspects, the VCU 212 may control vehicle operational aspects and implement one or more instruction sets received from the user device 204, from one or more instruction sets stored in the memory 220, including instructions operational as part of the POI annotation system 214.

The TCU 228 may be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2), computers, and modules. The TCU 228 may be disposed in communication with the ECUs 216 by way of a bus.

The ECUs 216 may control aspects of vehicle operation and communication using inputs from human drivers, inputs from an autonomous vehicle controller, the POI annotation system 214, and/or via wireless signal inputs received via the wireless connection(s) from other connected devices, such as the user device 204, the server(s) 206, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, wipers, door locks and access control, and various comfort controls. The BCM 222 may also operate as a gateway for bus and network interfaces to interact with remote ECUs (not shown in FIG. 2). In some aspects, the BCM 222 may additionally control operation of the HUD 110.

The DAT controller 230 may provide Level-1 through Level-3 automated driving and driver assistance functionality that can include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 210 may connect with an infotainment system 240. The infotainment system 240 may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or display notifications (including visual alert notifications), navigation maps, etc. on the touchscreen interface portion.

The vehicle 202 may further include the HUD 110, as described above in conjunction with FIG. 1. The automotive computer 210 and/or the POI annotation system 214 may control HUD operation via the BCM 222.

The computing system architecture of the automotive computer 210, the VCU 212, and/or the POI annotation system 214 may omit certain computing modules. It should be readily understood that the computing environment depicted in FIG. 2 is an example of a possible implementation according to the present disclosure, and thus, it should not be considered limiting or exclusive.

In accordance with some aspects, the POI annotation system 214 may be integrated with and/or executed as part of the ECUs 216. The POI annotation system 214, regardless of whether it is integrated with the automotive computer 210 or the ECUs 216, or whether it operates as an independent computing system in the vehicle 202, may include a transceiver 242, a processor 244, and a computer-readable memory 246.

The transceiver 242 may be configured to receive information/inputs from one or more external devices or systems, e.g., the user device 204, the server(s) 206, and/or the like via the network 208. Further, the transceiver 242 may transmit notifications (e.g., alert/alarm signals) to the external devices or systems. In addition, the transceiver 242 may be configured to receive information/inputs from vehicle components such as the infotainment system 240, the NAV receiver 236, the vehicle sensory system 234 (including the vehicle interior cameras and the IMU), and/or the like. Further, the transceiver 242 may transmit signals (e.g., command signals) or notifications to the vehicle components such as the infotainment system 240, the BCM 222, the HUD 110, etc.

The processor 244 and the memory 246 may be same as or similar to the processor 218 and the memory 220, respectively. In some aspects, the processor 244 may utilize the memory 246 to store programs in code and/or to store data for performing aspects in accordance with the disclosure. The memory 246 may be a non-transitory computer-readable memory storing the POI annotation program code. In some aspects, the memory 246 may additionally store information associated with the vehicle 202, inputs or information obtained from the user device 204 and the server(s) 206, and one or more sensory inputs received from the vehicle sensory system 234.

In operation, the driver 104 may activate a POI annotation mode of the HUD 110 by activating a dedicated actuator/button that may be disposed inside the vehicle 202, e.g., on a vehicle steering wheel, as described above in conjunction with FIG. 1. Responsive to the driver 104 activating the actuator, the actuator may generate and transmit a trigger signal to the transceiver 242. In other aspects, the driver 104 may activate the POI annotation mode by a voice command, a predefined hand-gesture, via the user device 204, the infotainment system 240, and/or the like. In this case, the user device 204 or the infotainment system 240 may generate and transmit the trigger signal to the transceiver 242.

The transceiver 242 may receive the trigger signal from the actuator, the user device 204 or the infotainment system 240, and may send the trigger signal to the processor 244. In addition, the transceiver 242 may receive inputs (e.g., real-time images) associated with driver's eye gaze movement and the vehicle orientation/pose from the vehicle sensory system 234, a real-time vehicle geolocation from the NAV receiver 236, and the information associated with the geographical area where the vehicle 202 may be located from the server(s) 206. Responsive to receiving the vehicle information (e.g., the real-time vehicle geolocation and the vehicle orientation/pose), the inputs associated with the driver's eye gaze movement and the information associated with the geographical area where the vehicle 202 may be located, the transceiver 242 may send the received information to the memory 246 for storage purpose.

The processor 244 may obtain the trigger signal from the transceiver 242. Responsive to obtaining the trigger signal, the processor 244 may fetch or obtain the vehicle information, the inputs associated with the driver's eye gaze movement and the information associated with the geographical area from the memory 246 or directly from the transceiver 242. In some aspects, the processor 244 may determine an eye gaze direction of the driver 104 relative to a vehicle travel direction based on the inputs associated with the driver's eye gaze movement. An example view of driver eye gaze direction is depicted in FIG. 3.

Figure 3:
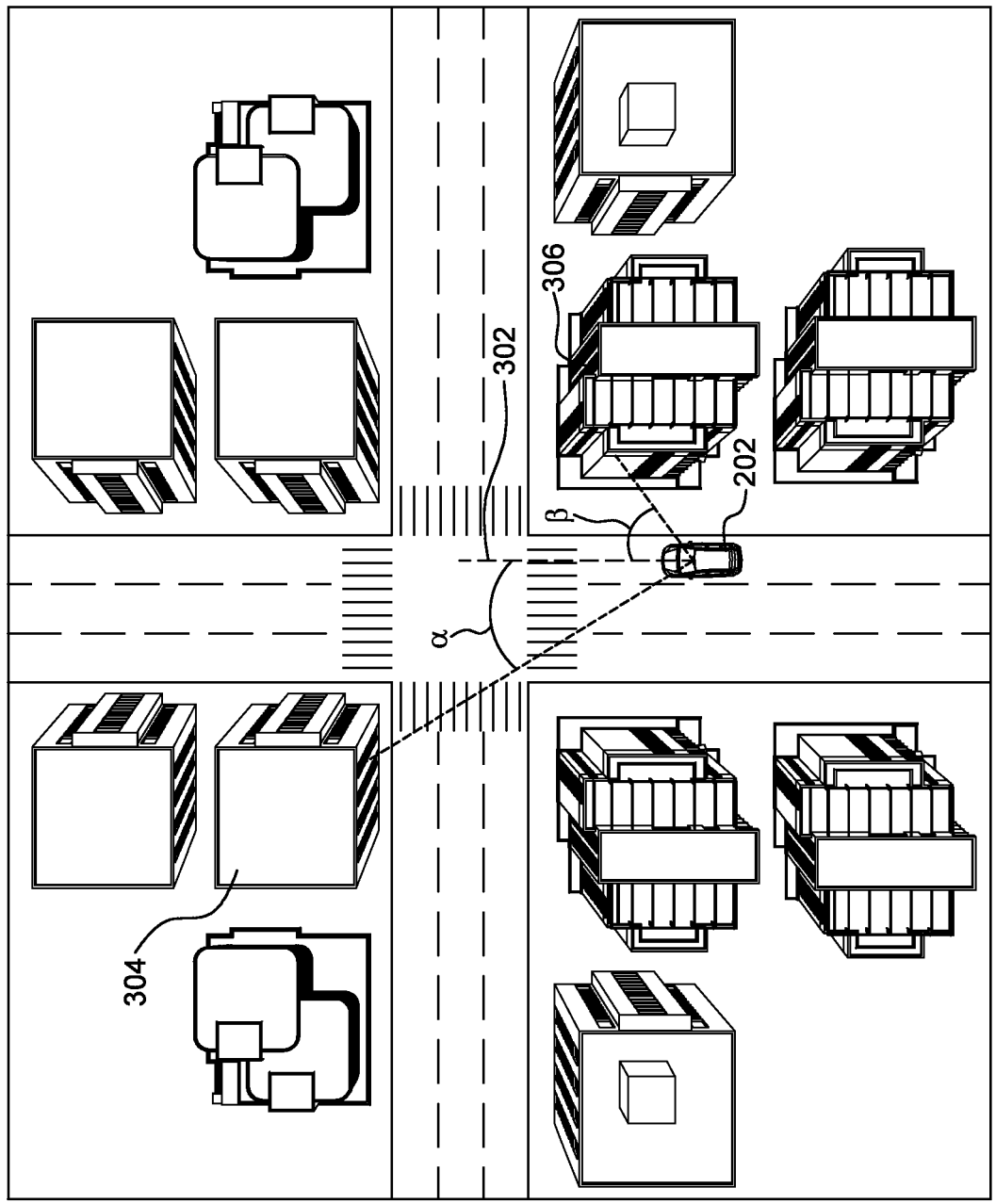
FIG. 3 depicts an exemplary view of driver eye gaze direction in accordance with the present disclosure.

As shown in FIG. 3, the vehicle 202 may be driving along a travel direction 302, and the driver 104 may rotate the eyes towards the left by an angle "α" relative to the travel direction 302 to view a building 304 while driving the vehicle 202. Similarly, the driver 104 may rotate the eyes towards the right by an angle "β" relative to the travel direction 302 to view a building 306 while driving the vehicle 202. In some aspects, the processor 244 may be configured to determine the angles "α" and "β" based on the inputs associated with the driver's eye gaze movement obtained from the memory 246 or the transceiver 242.

Although the description above describes an aspect where the processor 244 determines the driver's eye gaze direction, in some aspects, the eye gaze direction may be provided by the vehicle sensory system 234 itself or by any other vehicle component.

Responsive to determining or obtaining the driver's eye gaze direction, the processor 244 may determine an object (e.g., the building 304 or the building 306) that the driver 104 may be viewing while driving the vehicle 202 based on the vehicle information, the information associated with the geographical area and the driver's eye gaze direction. Specifically, the processor 244 may correlate the vehicle information, the information associated with the geographical area and the driver's eye gaze direction to determine the building (e.g., the building 304) that the driver 104 may be viewing. In an exemplary aspect, the processor 244 may perform vector identification and addition to determine the building 304 based on the information described above. An example snapshot illustrating vector addition is depicted in FIG. 4.

Figure 4:
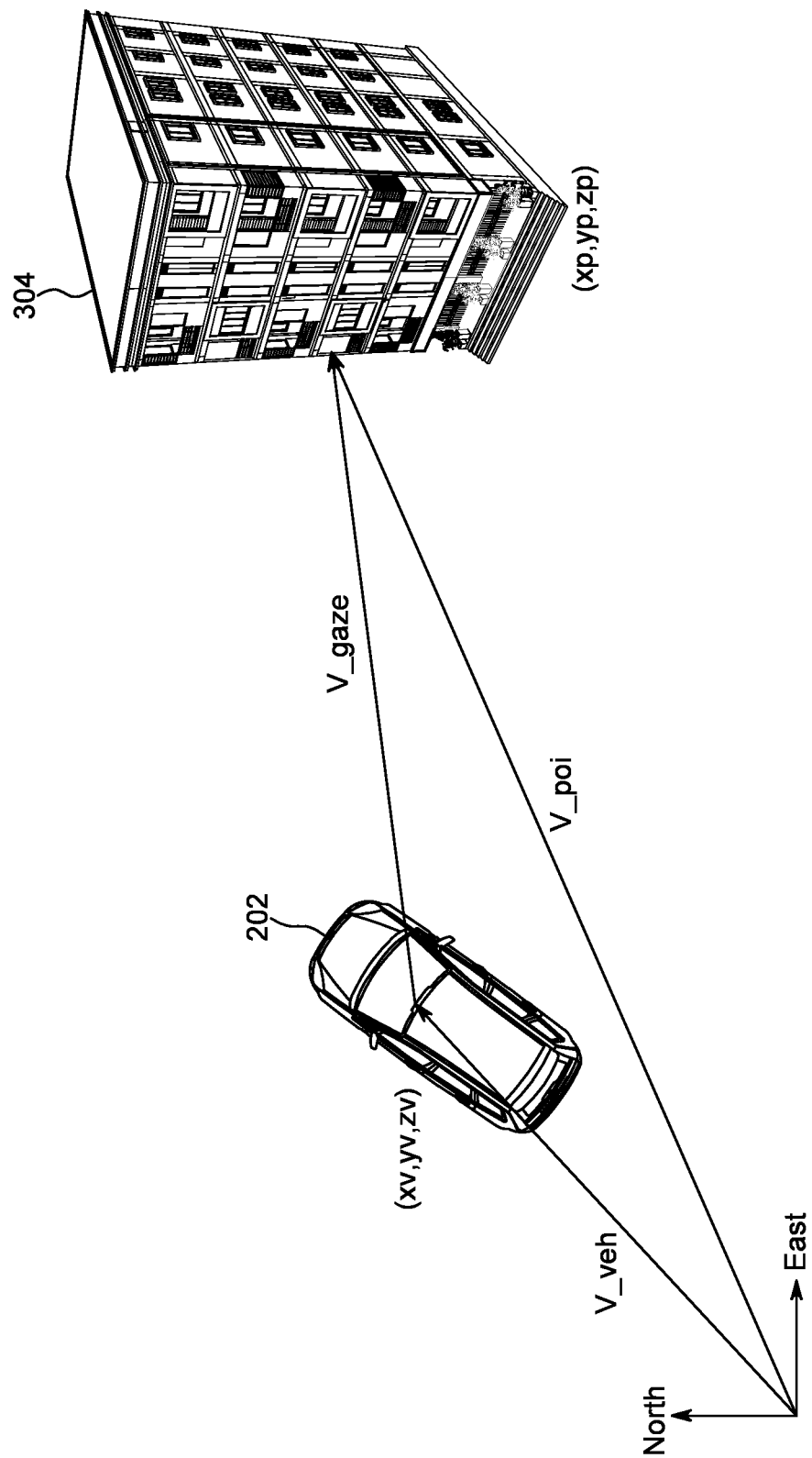
FIG. 4 depicts an exemplary snapshot illustrating a vehicle vector, a driver eye gaze vector and a point of interest (POI) vector in accordance with the present disclosure.

Specifically, the processor 244 may determine a vehicle vector "V_veh" (as shown in FIG. 4) in a coordinate space (e.g., on the geographical area digital map) based on the real-time vehicle geolocation, the vehicle orientation and the information associated with the geographical area where the vehicle 202 may be located. The processor 244 may then produce an eye gaze vector "V_gaze" based on the driver's eye gaze direction and the vehicle orientation. The processor 244 may then determine an object (e.g., the building 304) that the driver 104 may be viewing based on an intersection of the vector "V_gaze" with the building 304. The processor 244 may determine vector for the building 304 "V_poi" (or the coordinates associated with the building 304) by using an example expression, V_poi=V_vch+V_gaze.

Responsive to determining the coordinates associated with the building 304, the processor 244 may determine the object (e.g., the building 304) that the driver 104 may be viewing and an object identifier or a POI identifier for the building 304 based on the information associated with the geographical area. In some aspects, the POI identifier may include a building name (e.g., "Building 1" as described above in conjunction with FIG. 1) and/or other details associated with the building 304.

Responsive to determining the POI identifier, the processor 244 may render or display the POI identifier on the HUD 110 (e.g., via the BCM 222). In this manner, when the driver 104 returns the gaze to the HUD 110 from the building 304, the driver 104 may view name (and/or other details) of the building 304 on the HUD 110. This may facilitate the driver 104, especially when the driver 104 may not know the details (e.g., name, exit/entry points, parking lot location, etc.) of the building 304 or when the driver 104 may be driving the vehicle 202 in low visibility weather conditions.

In some aspects, the processor 244 may render the POI identifier on the HUD 110 for a predefined time duration (e.g., 2 to 5 seconds). In an exemplary aspect, the predefined time duration may be preset. In other aspects, the driver 104 may set the predefined time duration via the user device 204 or the infotainment system 240.

In further aspects, the processor 244 may render the POI identifier on the HUD 110 till the vehicle 202 travels past the building 304. In this case, the processor 244 may determine that the vehicle 202 may have travelled past the building 304 based on the real-time vehicle geolocation obtained from the NAV receiver 236. Responsive to determining that the vehicle 202 may have travelled past the building 304, the processor 244 may cause the HUD 110 to stop displaying the POI identifier. In additional aspects, the HUD 110 may display the POI identifier for a preset short time duration (that may be set by the driver 104) even after the vehicle 202 travels past the building 304.

In additional aspects, the driver 104 may set preferences of the type of objects for which the driver 104 may desire to view POI identifiers on the HUD 110. For example, before initiating a trip or while on the trip, the driver 104 may provide inputs or user preferences to the transceiver 242 (e.g., via the user device 204 or the infotainment system 240) indicating that the driver 104 desires to view POI identifiers for tourist spots, restaurants, gas stations or electric vehicle (EV) charging stations, and/or the like, on the road 106. Responsive to receiving the inputs from the driver 104, the transceiver 242 may generate the trigger signal (as described above) and send the trigger signal, along with the inputs received from the driver 104, to the processor 244.

The processor 244 may obtain the trigger signal and the inputs/user preferences from the transceiver 242. Responsive to obtaining the trigger signal, the processor 244 may track driver's eye gaze movement to determine the object (e.g., the building 304) that the driver 104 may be viewing, as described above. Responsive to determining that the driver 104 may be viewing the building 304, the processor 244 may determine whether the building 304 may be associated with the type of object (e.g., restaurants) for which the driver 104 desires to view the POI identifiers, based on the information associated with the geographical area. The processor 244 may not render/display the POI identifier for the building 304 on the HUD 110 when the processor 244 determines that the building 304 may not be a restaurant. On the other hand, the processor 244 may render/display the POI identifier for the building 304 on the HUD 110 when the processor 244 determines that the building 304 may be a restaurant. As described above, the processor 244 may display the POI identifier for a predefined time duration or till the vehicle 202 travels past the building 304.

Figure 5:
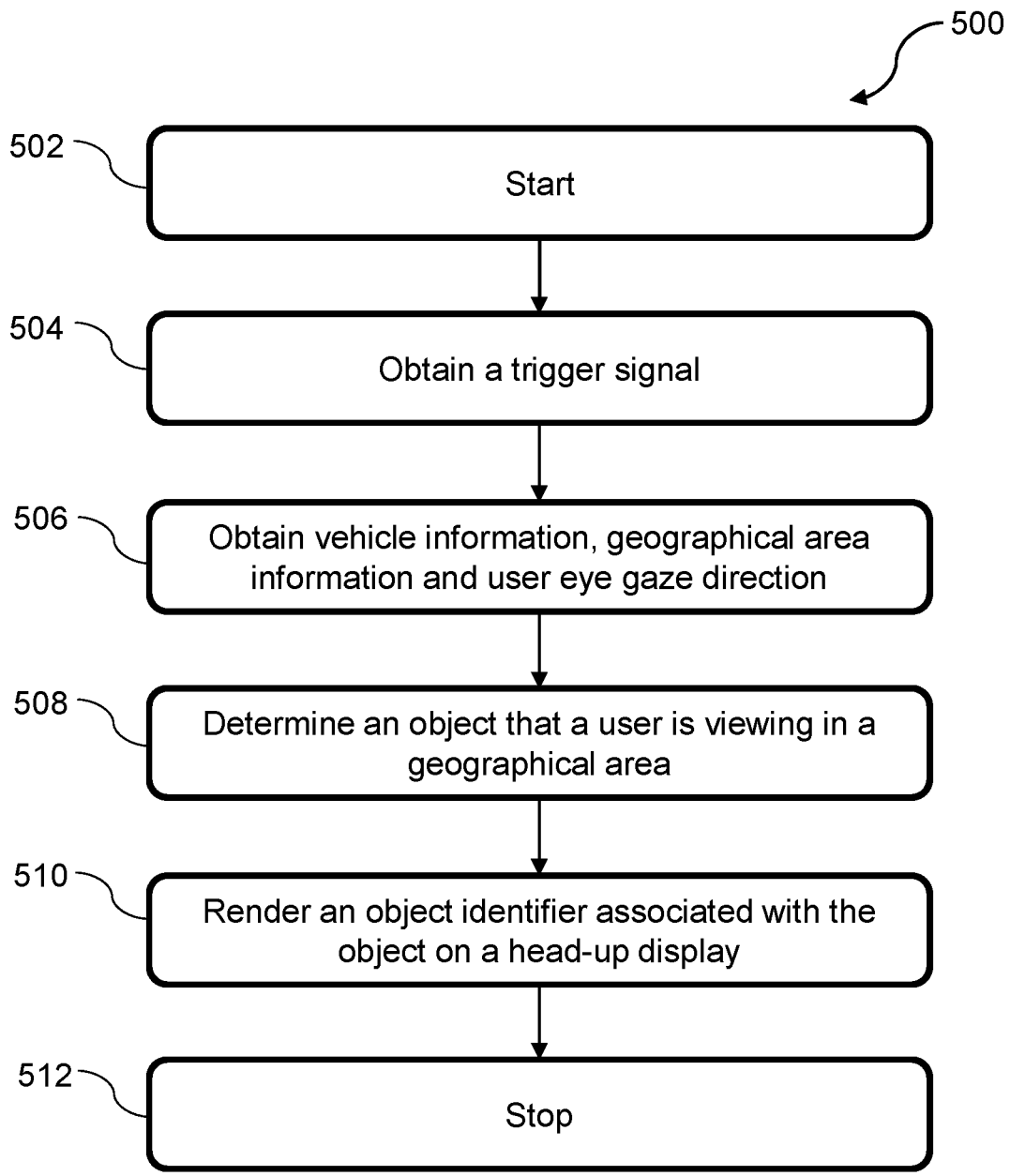
FIG. 5 depicts a flow diagram of an exemplary method for annotating an object on a vehicle HUD in accordance with the present disclosure.

FIG. 5 depicts a flow diagram of an example method 500 for annotating an object on a vehicle head-up display in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the processor 244, the trigger signal. As described above, the processor 244 may obtain the trigger signal when the driver 104 activates the POI annotation mode of the HUD 110 or when the driver 104 inputs (and transmits to the transceiver 242) preferences for the types of objects for which the driver 104 desires to view POI identifiers on the HUD 110.

At step 506, the method 500 may include obtaining, by the processor 244, the vehicle information, the information associated with the geographical area in which the vehicle 202 may be located and the user eye gaze direction, as described above. At step 508, the method 500 may include determining, by the processor 244, an object (e.g., the building 304) in the geographical area that the driver 104 may be viewing, based on the vehicle information, the information associated with the geographical area and the user eye gaze direction.

At step 510, the method 500 may include rendering, by the processor 244, an object identifier associated with the determined object on the HUD 110 for a predefined time duration or till the vehicle 202 travels past the object, as described above. The object identifier may be, for example, an object/building name.

The method 500 may end at step 512.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a head-up display;
a transceiver configured to receive vehicle information and information associated with a geographical area in which the vehicle is located;
a detection unit configured to detect a user eye gaze direction; and
a processor communicatively coupled with the head-up display, the transceiver and the detection unit, wherein the processor is configured to:
obtain a user preference indicating that a first type of object is of interest a user instead of a second type of object;
obtain a trigger signal;
obtain the vehicle information, the information associated with the geographical area and the user eye gaze direction responsive to obtaining the trigger signal;
determine a vehicle vector in a coordinate space based on the vehicle information and the information associated with the geographical area;
determine an eye gaze vector for the user based on the user eye gaze direction;
determine a vector associated with a first object based on an addition of the vehicle vector with the eye gaze vector;
determine that the user is viewing the first object based on the vector;
determine that the first object is the first type of object that is of interest to the user based on the information associated with the geographical area;
render, based on the determination that the first object is the first type of object that is of interest to the user, an object identifier associated with the first object on the head-up display until the vehicle travels past the first object;
determine a second object is a different type of object than the first type of object that is of interest to the user; and
render, based on the determination that the second object is a different type of object, the head-up display without an object identifier for the second object.

2. The vehicle of claim 1, wherein the vehicle information comprises a vehicle geolocation and a vehicle orientation.

3. The vehicle of claim 1 further comprising a Global Positioning System (GPS) receiver and an Inertial Measurement Unit (IMU), wherein the transceiver receives the vehicle information from the GPS receiver and the IMU.

4. The vehicle of claim 1, wherein the information associated with the geographical area comprises a digital map of the geographical area.

5. The vehicle of claim 1, wherein the processor is configured to obtain the trigger signal from a user device, a vehicle infotainment system or an actuator.

6. The vehicle of claim 1, wherein the transceiver is further configured to receive the user preference, and wherein the processor is configured to obtain the trigger signal from the transceiver.

7. The vehicle of claim 1, wherein the processor is further configured to render the object identifier on the head-up display for a preset time duration after the vehicle has passed the first object.

8. The vehicle of claim 7, wherein the transceiver is further configured to receive inputs associated with the preset time duration from a user device or a vehicle infotainment system.

9. The vehicle of claim 1, wherein the object identifier comprises an object name.

10. The vehicle of claim 9, wherein the processor is further configured to determine the object name based on the information associated with the geographical area.

11. A method to annotate an object on a head-up display of a vehicle, the method comprising:
obtaining, by a processor, a user preference indicating that a first type of object is of interest to a user instead of a second type of object;
obtaining, by the processor, a trigger signal;
obtaining, by the processor, vehicle information, information associated with a geographical area in which the vehicle is located and a user eye gaze direction responsive to obtaining the trigger signal;
determining, by the processor, a vehicle vector in a coordinate space based on the vehicle information and the information associated with the geographical area;
determining, by the processor, an eye gaze vector for the user based on the user eye gaze direction;
determining, by the processor, a vector associated with a first object based on an addition of the vehicle vector with the eye gaze vector;
determining, by the processor, that the user is viewing the first object based on the vector;
determining that the first object is the first type of object that is of interest to the user based on the information associated with the geographical area;
rendering, by the processor and based on the determination that the first object is the first type of object that is of interest to the user, an object identifier associated with the first object on the head-up display till the vehicle travels past the first object;
determining, by the processor, a second object is a different type of object than the first type of object that is of interest to the user; and
rendering, by the processor and based on the determination that the second object is a different type of object, the head-up display without an object identifier for the second object.

12. The method of claim 11, wherein the vehicle information comprises a vehicle geolocation and a vehicle orientation.

13. The method of claim 11, wherein obtaining the trigger signal comprises obtaining the trigger signal from a user device, a vehicle infotainment system or an actuator.

14. The method of claim 11, further comprising:
receiving the user preference; and
obtaining the trigger signal responsive to receiving the user preference.

15. The method of claim 11, further comprising rendering the object identifier on the head-up display for a preset time duration after the vehicle has passed the first object.

16. The method of claim 11, wherein the object identifier comprises an object name.

17. A non-transitory computer-readable storage medium having instructions stored thereupon which, when executed by a processor, cause the processor to:
obtain, prior to initiating a trip of a vehicle, a user preference indication that a first type of object is of interest to a user instead of a second type of object;
obtain a trigger signal;
obtain vehicle information, information associated with a geographical area in which the vehicle is located and a user eye gaze direction responsive to obtaining the trigger signal;
determine a vehicle vector in a coordinate space based on the vehicle information and the information associated with the geographical area;
determine an eye gaze vector for the user based on the user eye gaze direction;
determine a vector associated with a first object based on an addition of the vehicle vector with the eye gaze vector;
determine that the user is viewing the first object based on the vector;
determine that the first object is the first type of object that is of interest to the user based on the information associated with the geographical area;
render, based on the determination that the first object is the first type of object that is of interest to the user, an object identifier associated with the first object on a head-up display till the vehicle travels past the first object;
determine a second object is a different type of object than the first type of object that is of interest to the user; and
render, based on the determination that the second object is a different type of object, the head-up display without an object identifier for the second object.

18. The vehicle of claim 1, wherein the vehicle vector is based on an orientation of the vehicle, a location of the vehicle, and the geographical area in which the vehicle is located, and wherein the eye gaze vector is based on the eye gaze vector of the user and the orientation of the vehicle.

* * * * *